United States Patent [19]

Kato et al.

[11] Patent Number: 4,841,029

[45] Date of Patent: Jun. 20, 1989

[54] DIAZO COLORS AND DYEING METHOD USING THE SAME

[75] Inventors: Yoshiaki Kato, Mitaka; Toshio Hihara, Kitakyushu, both of Japan

[73] Assignee: Mitsubishi Chemical Industries Limited, Japan

[21] Appl. No.: 186,656

[22] Filed: Apr. 19, 1988

Related U.S. Application Data

[63] Continuation of Ser. No. 866,135, May 21, 1986, abandoned.

[30] Foreign Application Priority Data

May 28, 1985 [JP] Japan .................................. 60-113198

[51] Int. Cl.$^4$ ................... C09B 62/09; C09B 62/513; D06P 1/382; D06P 1/384
[52] U.S. Cl. ..................................... 534/634; 534/598; 534/617; 534/638; 534/642; 544/197
[58] Field of Search ........................ 534/617, 634, 642

[56] References Cited

U.S. PATENT DOCUMENTS

| 3,664,995 | 5/1972 | Andrew et al. ................ 534/634 X |
| 4,584,367 | 4/1986 | Matsuo et al. .................... 534/634 |
| 4,622,390 | 11/1986 | Meininger et al. ................. 534/634 |

FOREIGN PATENT DOCUMENTS 473870 7/1969 Switzerland ........................ 534/634

Primary Examiner—Floyd D. Higel
Attorney, Agent, or Firm—Jordan B. Bierman

[57] ABSTRACT

A disazo color having three triazine rings, one of which is substituted with a reactive group of $-NR^1-A-SO_2C_2H_4OSO_3M$, wherein $R^1$ represents a hydrogen atom or a lower alkyl group; A represents a substituted or unsubstituted phenylene or naphthylene group; and M represents a hydrogen atom or an alkali metal. The disazo color is capable of dyeing cellulose-containing fibers under conditions conventionally employed for dyeing polyester fibers with a disperse dye, making it possible to dye mixed fibers of cellulose fiber and polyester fiber in a single-bath through one step.

3 Claims, No Drawings

DIAZO COLORS AND DYEING METHOD USING THE SAME

This application is a continuation of application Ser. No. 866,135, filed May 21, 1986, and now abandoned.

FIELD OF THE INVENTION

This invention relates to novel disazo colors of orange to purple shade and, more particularly, to disazo colors suitable as water-soluble reactive dyes for cellulose-containing fiber and to a method of dyeing mixed fibers of cellulose fiber and polyester fiber with such shade.

BACKGROUND OF THE INVENTION

Recently, mixed fibers of cellulose fiber and polyester fiber (hereinafter referred to as C/P fibers) have been widely used. In dyeing the mixed fabric, the cellulose fibers are dyed with a water-soluble reactive dye, while the polyester fibers are dyed with a water-insoluble disperse dye. However, the reactive dye and the disperse dye differ each other in dyeing condition.

In some detail, dyeing of cellulose fibers with a reactive dye should be usually carried out in the presence of an acid binding agent, e.g., sodium carbonate, potassium carbonate, sodium hydroxide, etc., and an electrolyte, e.g., sodium chloride, sodium sulfate, etc., under conditions of pH of 10 or more and temperatures of not higher than 100° C. If the pH is too low during the dyeing, reactivity to cellulose fibers (degree of exhaustion) is reduced; and at too high a temperature, the reactive dye undergoes hydrolysis to a failure in satisfactory dyeing.

On the other hand, dyeing of polyester fibers with a disperse dye should be usually carried out under a weakly acidic to neutral condition at a high temperature of about 130° C. If the pH is too high, the disperse dye is hydrolyzed resulting in a failure of satisfactory dyeing; and if the temperature is too low, the degree of exhaustion is greatly reduced.

Therefore, dyeing of C/P fibers has been achieved by a two bath dyeing method, in which a dyeing bath is made weakly acidic to neutral, and polyester fibers are first dyed with a disperse dye at a high temperature of about 130° C., and then cellulose fibers are dyed with a reactive dye at a pH of 10 or higher at a temperature not more than 100° C.

In order to rationalize dyeing conditions, attempts have recently been made to dye C/P fibers with a mixture of a reactive dye and a disperse dye using a monobath in a single-stage method. In order to realize these attempts, it is inevitably required to develop a reactive dye which exhibits satisfactory reactivity (degree of exhaustion) without being hydrolyzed even under the conventional dyeing conditions for polyester fibers. However, reactive dye well serving this purpose has not yet been obtained.

Known reactive dyes include, for example, those represented by the following formulae A to C:

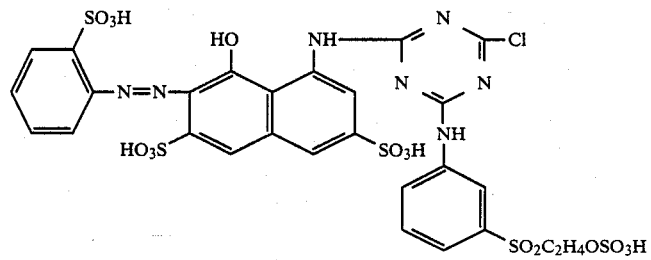

(A)

(Japanese Patent Publication No. 18184/64)

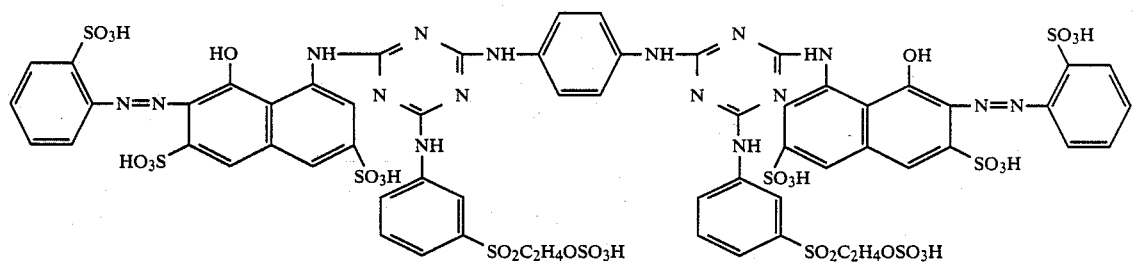

(B)

(Japanese Patent Publication (OPI) No. 260656/85, the term "OPI" herein used means "unexamined published application")

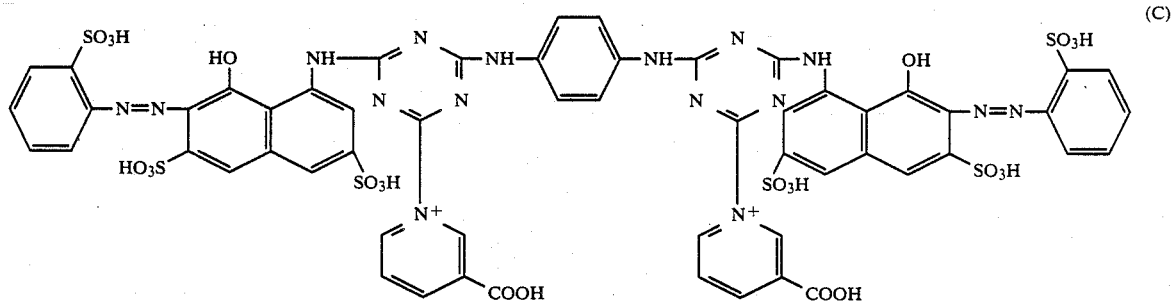

(C)

(Japanese Patent Application (OPI) No. 186682/83)

Any of these conventional reactive dyes has a disadvantage of seriously low reactivity to cellulose fibers (degree of exhaustion) under the dyeing conditions of a weakly acidic to neutral region and a high temperature of 130° C. and is, therefore, unsuitable as a reactive dye for dyeing C/P fibers according to a mono-bath single-stage dyeing method.

SUMMARY OF THE INVENTION

In the light of these circumstances, an object of this invention is to provide a reactive dye which is capable of satisfactorily dyeing cellulose fibers even under the dyeing conditions conventionally employed for polyester fibers and also which provides dyed products having high color fastness.

Another object of this invention is to provide a method of dyeing C/P fibers using such a reactive dye.

The above objects of this invention can be achieved by a novel disazo compound containing three triazine rings, said triazine rings having a specific reactive group.

The disazo colors according to the present invention can be represented by the formula (I):

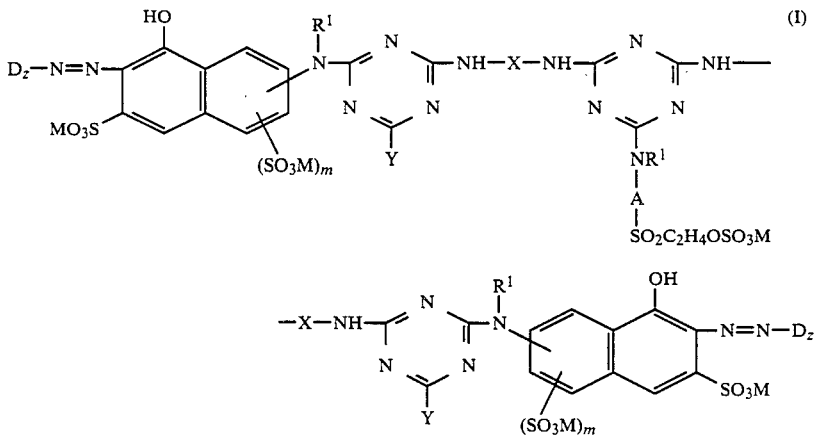

wheren M represents a hydrogen atom or an alkali metal; $D_z$ represents a diazo component residue of a benzene or naphthalene compound; $R^1$ represents a hydrogen atom or a lower alkyl group; A represents a phenylene or naphthylene group or a phenylene or naphthalene group substituted with a methyl group, a methoxy group, a halogen atom or a sulfonic group; X represents an aromatic or aliphatic divalent residual group; Y represents a halogen atom; and m represents 0 or 1. Asterisk in the formula means connecting bonds each other.

DETAILED DESCRIPTION OF THE INVENTION

In the above-described formula (I), the alkali metal as represented by M includes sodium, potassium, etc. The lower alkyl group as represented by $R^1$ includes an alkyl group having from 1 to 4 carbon atoms. The diazo component residue as represented by $D_z$ includes a phenyl or naphthyl group substituted with, for example, a sulfonic group, a methyl group, a methoxy group, etc. The divalent residual group as represented by X includes aliphatic groups, e.g., an ethylene group, a 1,3-propylene group, a 1,4-butylene group, a hexamethyl-ene group, etc., and a phenylene or naphthylene group, unsubstituted or substitued with a methyl group, a methoxy group, a carboxyl group, a sulfonic group, a chlorine atom, etc., with an unsubstituted phenylene group being particularly preferred. The halogen atom s represented by Y includes a chlorine atom, a fluorine atom and a bromine atom. A particularly preferred group for A is a phenylene group.

The disazo compounds represented by the above-described formula (I) can be prepared, for example, by condensing 2 mols of a compound represented by the formula (II):

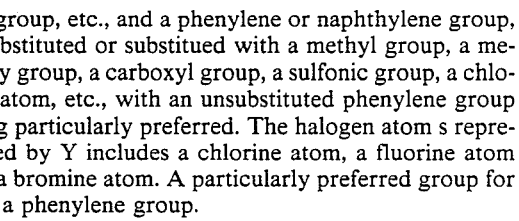

wherein M, $D_z$, $R^1$, Y and m are as defined above, and 1 mol of a compound represented by the formula (III):

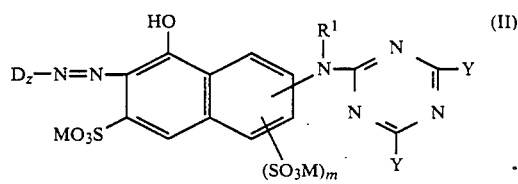

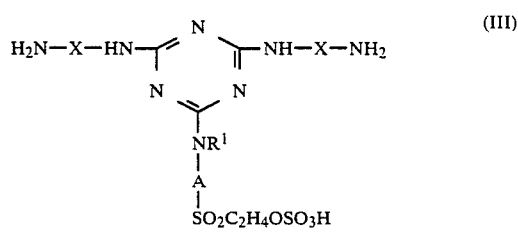

wherein M, $R^1$, A and X are as defined above.

The compound represented by the formula (III) can be prepared by, for example, condensing 1 mol of a cyanuric halide and 1 mol of a compound represented by the formula (III'):

$R^1NH-A-SO_2C_2H_4OH$    (III')

wherein $R^1$ and A are as defined above,
to form a compound represented by the formula (IV):

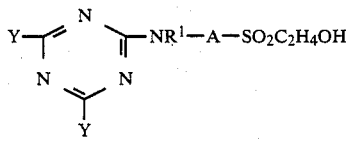

wherein Y, R$^1$ and A are as defined above,
condensing 1 mol of the compound (IV) and 2 mols of a compound represented by the formula (V):

wherein X is as defined above,
to form a compound represented by the formula (VI):

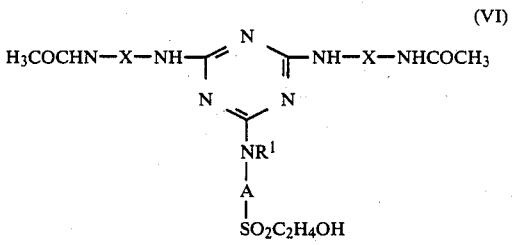

wherein R$^1$, A and X are as defined above,
and hydrolyzing the compound represented by the formula (VI) in dilute hydrochloric acid, followed by esterification in concentrated sulfuric acid.

The disazo colors in accordance with the present invention are generally useful as dyes for fibers, fabrics, etc., colorants for paper, colorants for inks of ink-jet type, and the like. In particular, they are excellent dyes for cellulose-containing fibers. The cellulose fibers to which the compounds of the invention are applicable include cotton fiber, viscose rayon fiber, cuprammonium rayon fiber, hemp fiber, etc. as well as mixed fibers of cellulose fiber and polyester fiber, triacetate fiber, polyacrylonitrile fiber, polyamide fiber, wool, silk, etc.

Dyeing of cellulose fibers with the disazo colors according to the present invention can be carried out by, for example, preparing a dyeing bath comprising the disazo compound represented by the formula (I), a buffering agent for maintaining the dyeing bath at a pH of from 5 to 10, and preferably from 6 to 8, during the dyeing, such as an acid, e.g., carbonic acid, phosphoric acid, acetic acid, citric acid, etc., and a sodium or potassium salt thereof, or a mixture thereof, usually at a concentration of from about 0.5 to about 5.0 g/l, and, if necessary, an electrolyte, such as sodium chloride, sodium sulfate, etc., usually at a concentration of from about 1 to about 150 g/l, pouring cellulose fibers into the dyeing bath, and heating at a temperature of from 100° to 150° C., and preferably from 120° to 140° C., for a period of from 30 to 50 minutes.

The disazo colors according to the present invention are suitably applied to dye C/P fibers in a mono-bath through one stage. In this case, dyeing can be effected under the above-described conditions by adding the disazo compound of the formula (I) and a known water-insoluble disperse dye to a dyeing bath simultaneously. The disperse dye which can be used in combination with the disazo compounds of the invention includes anthraquinone dyes, monoazo dyes, disazo dyes, and the like. The monazo dyes preferably include benzene-azobenzene compounds and benzothiazole-azobenzene compounds. The amount of these disperse dyes to be used can be appropriately determined according to a mixing proportion of C/P fibers to be dyed.

This invention will now be illustrated in greater detail with reference to the following examples, but it should be understood that they are not intended to limit the present invention.

EXAMPLE 1

Synthesis of Color

A monoazo color represented by the formula:

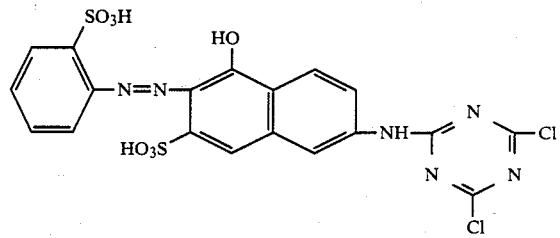

and a dimaine represented by the formula:

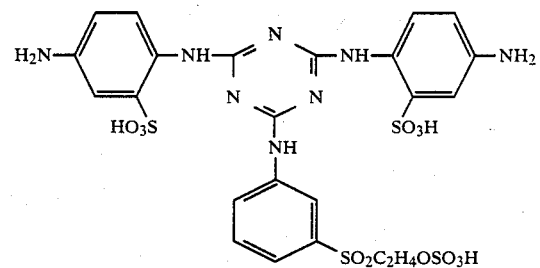

were condensed at a molar ratio of 2:1 in an aqueous medium at a temperature of from 30° to 40° C. The resulting reaction mixture was subjected to salting-out with sodium chloride to obtain a disazo compound having the following formula (shown in the form of free acid) and a visible absorption maximum ($\lambda_{max}$) at 476 nm in water:

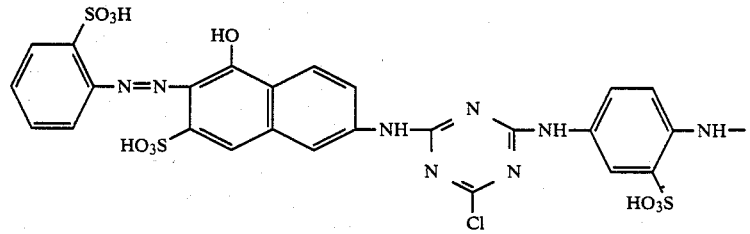

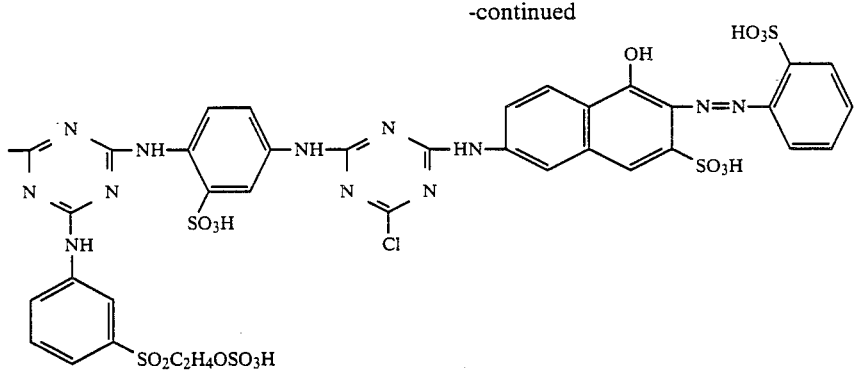

The diamine compound used as a starting compound was prepared by condensing 18.4 g of a cyanuric chloride and 20.1 g of 3-(β-hydroxyethyl)sulfoaniline at 5° C. or less, condensing the resulting product with 23.0 g of 4-aminoacetanilide-3-sulfonic acid at 30° to 40° C., further condensing the resulting product with 23.0 g of 4-aminoacetanilide-3-sulfonic acid at 90° to 100° C. to form a compound of the formula:

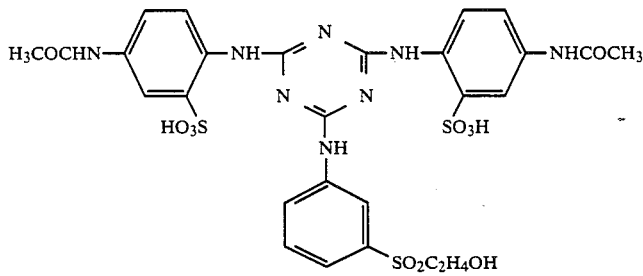

hydrolyzing this compound in 2N hydrochloric acid, and esterifying the hydrolyzate in concentrated sulfuric acid.

Dyeing of Cellulose Fiber

Test for dyeing properties of the above prepared disazo color on cellulose fibers was conducted under dyeing conditions at substantially same level as those conventionally employed for polyester fibers.

To 200 ml of water were added 0.2 g of the above prepared disazo compound, 16 g of sodium sulfate and, as buffering agents, 0.4 g of Na$_2$HPO$_4$12H$_2$O and 0.1 g of KH$_2$PO$_4$ to prepare a dyeing bath at a pH of 7. Ten grams of non-mercerized cotton knitted fabric were dipped in the bath, and the temperature was elevated up to 120° C. over a period of 30 minutes, at which dyeing was effected for 60 minutes. The fabric was taken out, washed with water, subjected to soaping, washed with water, and dried to obtain fabric dyed in orange.

The dyeing properties of the disazo dye were determined as follows. As a result, the dye exhibited very satisfactory dyeing properties having a degree of exhaustion of 82%, light-fastness of the 4th grade, and chlorine-fastness of the 5th minus grade.

Degree of Exhaustion (%)

$$\frac{\text{Weight of Dye Absorbed in Fiber}}{\text{Total Weight of Dye in Dye Bath Before Dyeing}} \times 100$$

Color Fastness to Light

Fastness was evaluated after irradiation with light of a carbon arc lamp for 20 or 40 hours in accordance with the test method of JIS (Japanese Industrial Standard) L0842.

Color Fastness to Chlorine

Fastness was evaluated at a chlorine concentration of 20 ppm in accordance with the test method of JIS L0884.

EXAMPLE 2

Synthesis of Color

A monoazo color represented by the formula:

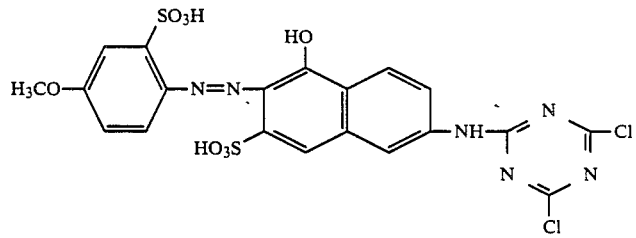

and a diamine represented by the formula:

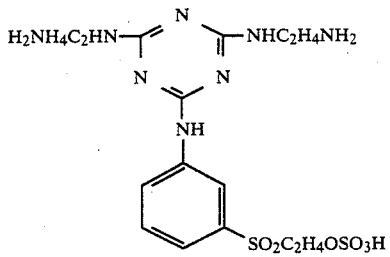

were condensed at a molar ratio of 2:1 at 30° to 40° C. in an aqueous medium, followed by salting-out with potassium chloride to prepare a disazo compound having the following formula (shown in the form of free acid) and a $\lambda_{max}$ of 495 nm (in water):

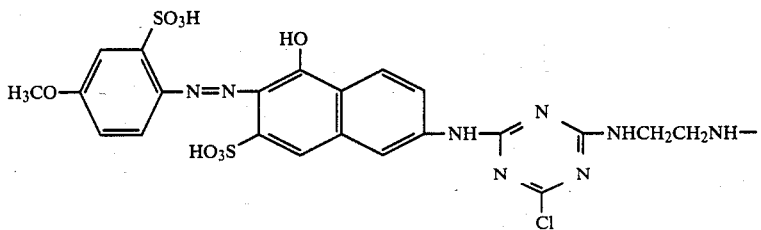

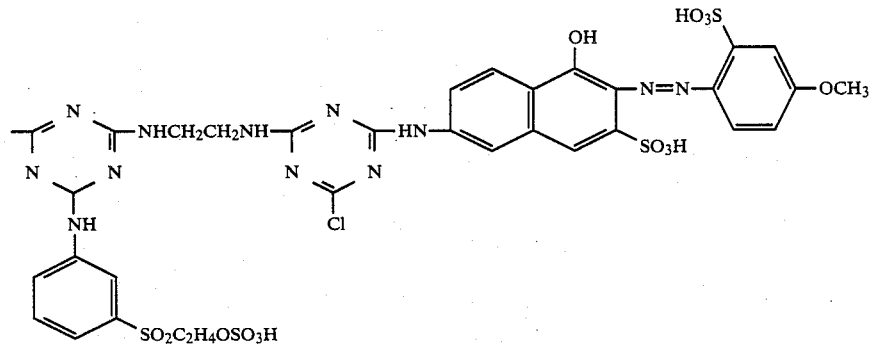

The diamine compound used as a starting compound was prepared in the same manner as described in Example 1 but replacing 4-aminoacetanilde-3-sulfonic acid with monoacetylethylenediamine.

Dyeing of Cellulose Fiber

Test of dyeing properties of the above prepared disazo color on cellulose fibers was conducted under dyeing conditions at substantially same level as those conventionally employed for polyester fibers.

To 200 ml of water were added 0.2 g of the above prepared disazo compound, 16 g of sodium sulfate and, as buffering agents, 0.5 g of $Na_2HPO_4 12H_2O$ and 0.02 g of $KH_2PO_4$ to prepare a dye bath. Ten grams of non-mercerized cotton knitted fabric were dipped in the bath, and the temperature was elevated up to 130° C. over a period of 30 minutes. The fabric was taken out, washed with water, subjected to soaping, washed with water and dried to obtain fabric dyed in scarlet. The dye bath was maintained at a pH of 8 before and throughout the dyeing.

The resulting dyed fabric had a degree of exhaustion of 75%, light-fastness of the 4th minus grade and chlorine-fastness of the 5th minus grade.

EXAMPLE 3

Synthesis of Color

A monoazo color represented by the formula:

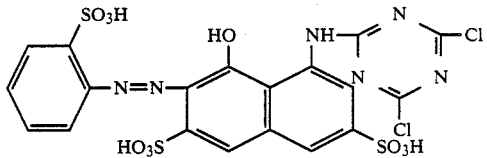

and a diamine represented by the formula:

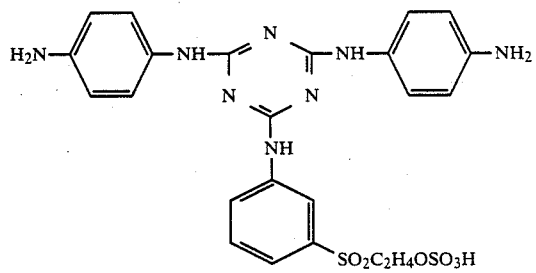

were condensed at a molar ratio of 2:1 at 30° to 40° C. in an aqueous medium, and the reaction mixture was spray-dried to prepare a disazo compound having the following formuls (shown in the form of free acid) and a $\lambda_{max}$ of 552 nm (in water).

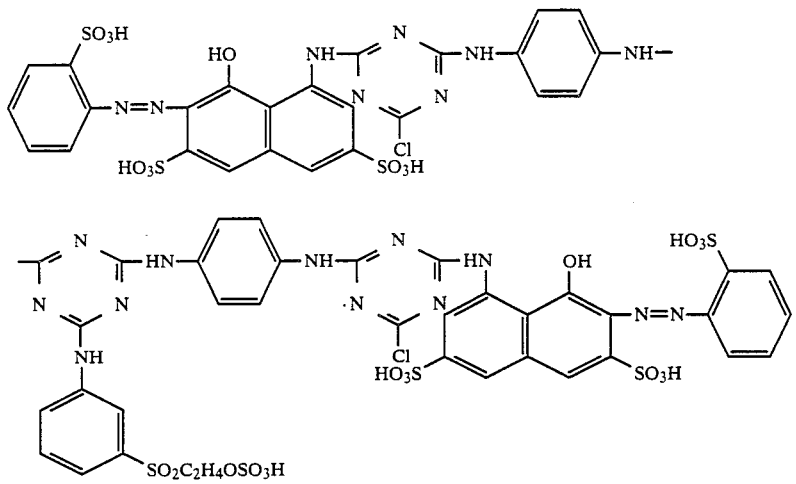

The diamine compound used as a starting compound was prepared in the same manner as described in Example 1 but replacing 4-aminoacetanilide-3-sulfonic acid with p-aminoacetanilide.

Dyeing of Cellulose Fiber

Test of dyeing properties of the above prepared disazo color on cellulose fibers was conducted under dyeing conditions substantially equal to those conventionally employed for polyester fibers. Dyeing of non-mercerized cotton knitted fabric was carried out in the same manner as in Example 1 except for changing the dyeing temperatures to 130° C.

The resulting fabric deeply dyed in red showed a degree of exhaustion of 88% and had light-fastness of the 4th plus grade and chlorine-fastness of the 4th to 5th grade.

Dyeing of C/P Fiber

Test of dyeing properties of the above prepared disazo color on C/P fibers was conducted under dyeing conditions substantially equal to those conventionally employed for polyester fibers.

To 200 ml of water were added 0.2 g of the above disazo compound, 0.2 g of a known water-insoluble anthraquinone dye of the formula:

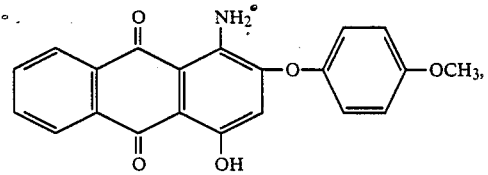

12 g of sodium sulfate and, as buffering agents, 0.4 g of $Na_2HPO_4 12H_2O$ and 0.1 g of $KH_2PO_4$ to prepare a dye bath. Ten grams of mixed fabric composed of polyester and cotton (50:50) were dipped in the bath, and the temperature was elevated up to 130° C. over a period of 30 minutes, at which dyeing was effected for 60 minutes. The fabric was taken out, washed with water, subjected to soaping, washed with water and dried to obtain fabric evenly dyed in red. The dye bath was maintained at a pH of 7 before and throughout the dyeing.

The degrees of exhaustion of both the disazo color according to the present invention and the known disperse dye were very satisfactory, and the resulting dyed fabric showed uniformity in color and high color density, light-fastness of the 4th to 5th grade and chlorine-fastness of the 5th minus grade.

COMPARATIVE EXAMPLES 1 TO 3

Test of dyeing properties of the known water-soluble dyes for cellulose fibers as represented by the above-described formulae (A) to (C) were conducted in the same manner as described in Example 1. The results obtained are shown in Table 1 below together with the results of Examples 1 to 3.

TABLE 1

| Example No. | Color Used | Dyeing Conditions pH | Temperature (°C.) | Degree of Exhaustion (%) |
|---|---|---|---|---|
| Example 1 | Color of Example 1 | 7 | 120 | 82 |
| Example 2 | Color of Example 2 | 8 | 130 | 75 |
| Example 3 | Color of Example 3 | 7 | 130 | 88 |
| Comparative Example 1 | (A) | 7 | 130 | 13 |
| Comparative Example 2 | (B) | 7 | 130 | 61 |
| Comparative Example 3 | (C) | 7 | 130 | 66 |

EXAMPLES 4 TO 38

In the same manner as described in Example 1, disazo colors having the formula shown in Tables 2 and 3 (shown in the form of free acid) were prepared. The $\lambda_{max}$ in water of the resulting colors and the shades obtained by dyeing cotton fabric with these colors are also shown in Tables 2 and 3.

TABLE 2

Disazo Compound (I)

[Structure [I]: Dz—N=N—[naphthalene with OH, HO₃S, (SO₃H)ₘ, R¹]—N—[triazine with Cl, NH-X-NH-triazine(Cl)-NH-A-SO₂C₂H₄OSO₃H]—... symmetric structure with second Dz—N=N on other naphthalene bearing OH and SO₃H]

| Ex. No. | Dz— | (SO₃H)ₘ [naphthol] | —R¹ | —A—SO₂C₂H₄OSO₃H | —X— | λmax (H₂O) (nm) | Shade of Dyed Cotton Fabric |
|---|---|---|---|---|---|---|---|
| 4 | 2-sulfophenyl (SO₃H) | 1-hydroxy-3-sulfo-7-yl naphthyl | —CH₃ | 4-(SO₂C₂H₄OSO₃H)phenyl | 1,4-phenylene | 477 | orange |
| 5 | 2,4-disulfophenyl | 1-hydroxy-3-sulfo-7-yl naphthyl | —H | 3-(SO₂C₂H₄OSO₃H)phenyl | 1,3-phenylene (methyl) | 475 | orange |
| 6 | 2-sulfo-5-methylphenyl | 1-hydroxy-3-sulfo-7-yl naphthyl | —H | 3-(SO₂C₂H₄OSO₃H)phenyl | —CH₂CH₂— | 487 | orange |

TABLE 2-continued

Disazo Compound (I):

[Structure I shown]

| Ex. No. | Dz— | (SO₃H)ₘ [naphthol group] | —R¹ | —A—SO₂C₂H₄OSO₃H | —X— | λ_max (H₂O) (nm) | Shade of Dyed Cotton Fabric |
|---|---|---|---|---|---|---|---|
| 7 | 2-methoxy-5-sulfo phenyl (H₃CO—C₆H₃—SO₃H) | 1-hydroxy-2-methyl-6-sulfo naphthyl | —H | 4-methoxy-3-methyl phenyl-SO₂C₂H₄OSO₃H | 3,5-dimethyl phenyl (—CH₃) | 497 | scarlet |
| 8 | 2-sulfo phenyl | 1-hydroxy-2-methyl-6-sulfo naphthyl | —H | 5-methoxy-2-methyl phenyl-SO₂C₂H₄OSO₃H | 2,3-dimethyl phenyl | 490 | reddish orange |
| 9 | 2-sulfo phenyl | 1-hydroxy-2-methyl-6-sulfo naphthyl | —CH₃ | 4-phenyl-SO₂C₂H₄OSO₃H | 2,5-dimethyl-sulfo phenyl (SO₃H) | 491 | reddish orange |

TABLE 2-continued
Disazo Compound (I)
[I]
| Ex. No. | Dz— | <image (SO₃H)ₘ structure> | —R¹ | —A—SO₂C₂H₄OSO₃H | —X— | λ_max (H₂O) (nm) | Shade of Dyed Cotton Fabric |
|---|---|---|---|---|---|---|---|
| 10 | 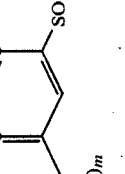 | 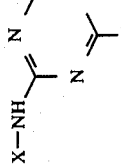 | —C₂H₅ | 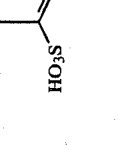 |  | 498 | scarlet |
| 11 | 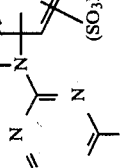 | 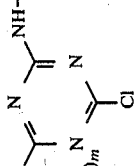 | —H |  | —CH₂CH₂CH₂— | 496 | scarlet |
| 12 | 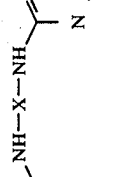 | 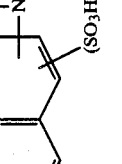 | —H |  | <image structure naphthalene with SO₃H groups> | 475 | orange |

TABLE 2-continued

Disazo Compound (I)

[Structure I shown]

| Ex. No. | Dz— | —R¹ | (SO₃H)ₘ structure | —A—SO₂C₂H₄OSO₃H | —X— | λ_max (H₂O) (nm) | Shade of Dyed Cotton Fabric |
|---|---|---|---|---|---|---|---|
| 13 | phenyl with SO₃H (ortho) | —H | naphthalene with OH, SO₃H, CH₃ (HO₃S, CH₃ substituents) | phenyl with SO₃H and SO₂C₂H₄OSO₃H | dimethyl-phenyl with OCH₃ | 491 | reddish orange |
| 14 | naphthalene with SO₃H and HO₃S | —H | naphthalene with OH, CH₃, HO₃S | phenyl with OCH₃, OCH₃, CH₃, SO₂C₂H₄OSO₃H | cyclohexane-1,4-diyl (CH, CH₂CH₂, CH₂CH₂) | 493 | reddish orange |
| 15 | naphthalene with SO₃H | —H | naphthalene with OH, CH₃, HO₃S | phenyl with SO₂C₂H₄OSO₃H (para-methyl) | methylphenyl | 484 | orange |

TABLE 2-continued

Disazo Compound (I)

[Structure I: Dz—N=N— attached to naphthalene ring bearing OH, HO₃S, (SO₃H)ₘ, linked via R¹—N to triazine (with Cl) —NH—X—NH— triazine (with Cl, and NH—A—SO₂C₂H₄OSO₃H) —N(R¹)— naphthalene (OH, HO₃S, (SO₃H)ₘ) —N=N—Dz]

| Ex. No. | Dz— | (SO₃H)ₘ naphthalene with R¹ | R¹ | —A—SO₂C₂H₄OSO₃H | —X— | λ_max (H₂O) (nm) | Shade of Dyed Cotton Fabric |
|---|---|---|---|---|---|---|---|
| 16 | 3-methyl-naphthalene-2,6-disulfonic acid (HO₃S, SO₃H, CH₃ substituents) | 1-hydroxy-2-methyl-6-sulfo-naphthalene | —H | p-tolyl-SO₂C₂H₄OSO₃H | —CH₂CH₂— | 485 | orange |
| 17 | 2-methyl-naphthalene-1,5-disulfonic acid | 1-hydroxy-2-methyl-6-sulfo-naphthalene | —H | m-tolyl-SO₂C₂H₄OSO₃H | —CH₂CH₂CH₂CH₂— | 484 | orange |
| 18 | o-tolyl-SO₃H | 1-hydroxy-2-methyl-6,8-disulfo-naphthalene | —H | p-tolyl-SO₂C₂H₄OSO₃H | —CH₂CH₂— | 537 | red |

TABLE 2-continued

Disazo Compound (I)

[Structure [I]: Dz—N=N—[naphthalene with OH, (SO₃H)ₘ, HO₃S]—N(R¹)—C(=N)—NH—[triazine with Cl]—N=C—NH—X—NH—C=N—[triazine with NH—A—SO₂C₂H₄OSO₃H]—N=C—NH—X—NH—C(=N)—N(R¹)—[naphthalene with (SO₃H)ₘ, OH, SO₃H]—N=N—Dz]

| Ex. No. | Dz— | (SO₃H)ₘ [naphthol] | —R¹ | —A—SO₂C₂H₄OSO₃H | —X— | $\lambda_{max}$ (H₂O) (nm) | Shade of Dyed Cotton Fabric |
|---|---|---|---|---|---|---|---|
| 19 | 4-SO₃H, 2-CH₃ phenyl (with SO₃H) | 1-OH, 8-CH₃, 3-SO₃H, 6-SO₃H naphthalene | —H | 4-OCH₃, 3-CH₃ phenyl-SO₂C₂H₄OSO₃H | 1,4-phenylene (p-tolylene) | 536 | red |
| 20 | 2-CH₃, 5-SO₃H phenyl | 1-OH, 8-CH₃, 3-SO₃H, 6-SO₃H naphthalene | —H | phenyl-SO₂C₂H₄OSO₃H | 2,5-dimethylphenylene (CH₃) | 550 | bluish red |
| 21 | 2-CH₃, 5-OCH₃ phenyl-SO₃H | 1-OH, 8-CH₃, 3-SO₃H, 6-SO₃H naphthalene | —H | 4-OCH₃, 3-CH₃ phenyl-SO₂C₂H₄OSO₃H | —CH₂CH₂CH₂CH₂— | 532 | reddish purple |

TABLE 2-continued

Disazo Compound (I)

[Structure I shown: A symmetric disazo compound with two naphthalene units (each bearing OH, SO₃H, and (SO₃H)ₘ substituents) connected via N=N–Dz groups, linked by –NH–X–NH– bridges to triazine rings (each with Cl) connected through a central –NH–A–SO₂C₂H₄OSO₃H group.]

| Ex. No. | Dz— | (SO₃H)ₘ | —R¹ | —A—SO₂C₂H₄OSO₃H | —X— | λ_max (H₂O) (nm) | Shade of Dyed Cotton Fabric |
|---|---|---|---|---|---|---|---|
| 22 | 2-SO₃H-phenyl | 1-OH, 2-(naphthalene), 6-SO₃H | —H | 2,5-disubstituted-4-OCH₃, 1-CH₃-phenyl with SO₂C₂H₄OSO₃H | 2-Cl-phenyl (1,4-linked) | 513 | red |
| 23 | 2-SO₃H-phenyl | 1-OH, 7-SO₃H naphthalene, 3-SO₃H | —C₄H₉(n) | 4-substituted phenyl with SO₂C₂H₄OSO₃H | phenyl (1,4-linked) | 538 | red |
| 24 | 2-SO₃H-naphthyl | 1-OH, 7-SO₃H naphthalene, 3-SO₃H | —H | 3-substituted phenyl with SO₂C₂H₄OSO₃H | 2-SO₃H-phenyl (1,4-linked) | 543 | bluish red |

TABLE 2-continued

Disazo Compound (I)

[Structure I: Dz—N=N—(naphthalene with OH, HO₃S, (SO₃H)ₘ)—N(R¹)—C(=N)—N=C(Cl)—N=C—NH—X—NH—C=N—C(=N—A—SO₂C₂H₄OSO₃H)—NH ... NH—X—NH—C=N—C(Cl)=N—N(R¹)—(naphthalene with (SO₃H)ₘ, HO₃S, OH)—N=N—Dz]

| Ex. No. | Dz— | (SO₃H)ₘ [naphthalene] | —R¹ | —A—SO₂C₂H₄OSO₃H | —X— | $\lambda_{max}$ (H₂O) (nm) | Shade of Dyed Cotton Fabric |
|---|---|---|---|---|---|---|---|
| 25 | naphthalene with SO₃H, HO₃S (CH₃ substituent) | naphthalene with OH, HO₃S, CH₃ | —H | phenyl with OCH₃, CH₃, SO₂C₂H₄OSO₃H | —CH₂CH₂— | 542 | bluish red |
| 26 | naphthalene with SO₃H, HO₃S (CH₃ substituent) | naphthalene with OH, HO₃S, CH₃ | —H | phenyl with SO₃H, SO₂C₂H₄OSO₃H | m-phenylene (CH₃) | 540 | red |
| 27 | phenyl with SO₃H, CH₃ | naphthalene with OH, HO₃S, CH₃, SO₃H | —H | phenyl with Cl, CH₃, SO₂C₂H₄OSO₃H | p-phenylene | 551 | red |

TABLE 2-continued

Disazo Compound (I)

| Ex. No. | Dz— | —R¹ | (SO₃H)m | —A—SO₂C₂H₄OSO₃H | —X— | λmax (H₂O) (nm) | Shade of Dyed Cotton Fabric |
|---|---|---|---|---|---|---|---|
| 28 | phenyl-SO₃H (ortho) | —H | naphthalene with OH, HO₃S, SO₃H | naphthalene-SO₃H with SO₂C₂H₄OSO₃H | m-xylylene | 553 | red |
| 29 | 2-methyl-5-SO₃H phenyl | —H | naphthalene with OH, HO₃S, SO₃H | naphthalene with SO₃H and SO₂C₂H₄OSO₃H | p-phenylene | 553 | bluish red |
| 30 | 2-methyl-5-methoxy phenyl-SO₃H | —H | naphthalene with OH, HO₃S, CH₃ | bromo-methyl-phenyl-SO₂C₂H₄OSO₃H | 3,5-dimethyl benzoic acid (COOH) | 493 | scarlet |

TABLE 3

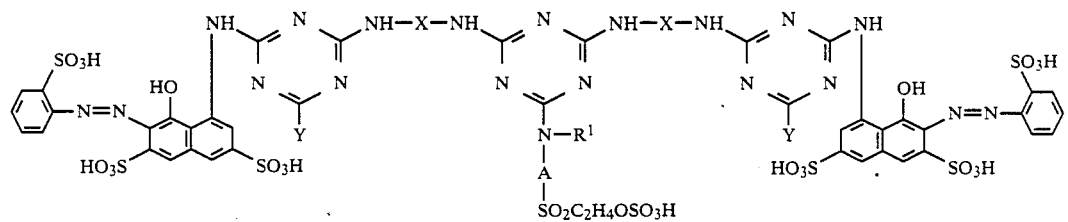

| Example No. | —Y | —R[1] | —A—SO$_2$C$_2$H$_4$OSO$_3$H | —X— | λ$_{max}$ (H$_2$O) (nm) | Shade of Dyed Cotton Fabric |
|---|---|---|---|---|---|---|
| 31 | —F | —H | *m*-phenylene-SO$_2$C$_2$H$_4$OSO$_3$H | *p*-phenylene | 551 | red |
| 32 | —F | —CH$_3$ | *p*-phenylene-SO$_2$C$_2$H$_4$OSO$_3$H | *m*-phenylene | 552 | red |
| 33 | —F | —H | 2-methyl-1-sulfo-6-(SO$_2$C$_2$H$_4$OSO$_3$H)-naphthyl | 5-COOH-*m*-phenylene | 551 | red |
| 34 | —F | —C$_3$H$_7$(n) | 3-Cl-5-(SO$_2$C$_2$H$_4$OSO$_3$H)-phenylene | *p*-phenylene | 552 | red |
| 35 | —Br | —C$_4$H$_9$(n) | *p*-phenylene-SO$_2$C$_2$H$_4$OSO$_3$H | 5-SO$_3$H-*m*-phenylene | 553 | red |
| 36 | —Cl | —CH$_3$ | *m*-phenylene-SO$_2$C$_2$H$_4$OSO$_3$H | *p*-phenylene | 552 | red |
| 37 | —Cl | —C$_2$H$_5$ | 3-CH$_3$-4-(SO$_2$C$_2$H$_4$OSO$_3$H)-phenylene | *m*-phenylene | 552 | red |

TABLE 3-continued

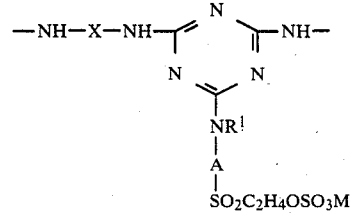

| Example No. | -Y | -R[1] | -A-SO$_2$C$_2$H$_4$OSO$_3$H | -X- | $\lambda_{max}$ (H$_2$O) (nm) | Shade of Dyed Cotton Fabric |
|---|---|---|---|---|---|---|
| 38 | -Cl | -CH$_3$ | 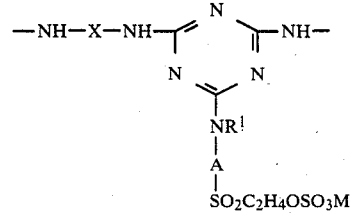 | 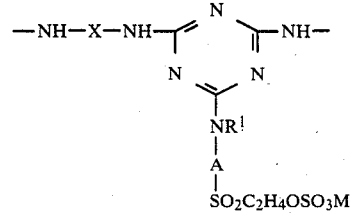 | 552 | red |

As described above, the disazo colors according to the present invention are excellent as dyes for cellulose-containing fibers. In particular, since they are capable of dyeing cellulose fibers under conditions conventionally employed for dyeing polyester fibers with disperse dyes, i.e., in a weakly acidic to neutral region at a temperature of from 120° to 140° C., they can be used for dyeing C/P fibers in a mono-bath single-stage dyeing method, and are, therefore, very promising from the industrial viewpoint.

While the invention has been described in detail and with reference to specific embodiments thereof, it will be apparent to one skilled in the art that various changes and modifications can be made therein without departing from the spirit and scope thereof.

What is claimed is:

1. A disazo dyestuff represented by the formula:

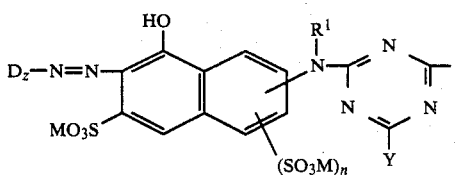

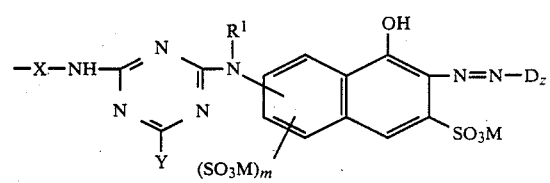

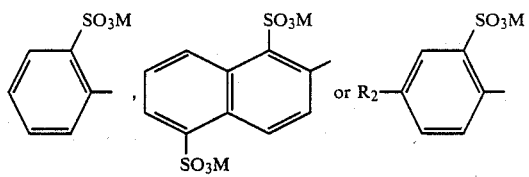

wherein D$_z$ represents

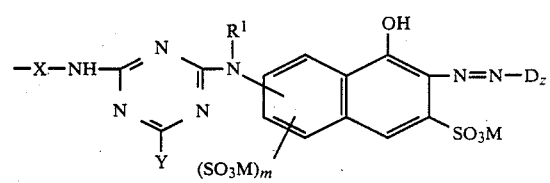

M represents hydrogen or alkali metal; R[1] represents hydrogen or lower alkyl; R[2] represents lower alkyl or lower alkoxy; A represents phenylene; X represents phenylene or phenylene substituted with methyl, methoxy, carboxy, sulfonic, or chlorine; Y represents halogen; and m represents 0 or 1.

2. The disazo dyestuff of claim 1 wherein the dyestuff is a water-soluble reactive dyestuff for dyeing cellulose-containing fibers.

3. The disazo dyestuff of claim 1 wherein X is phenylene or phenylene substituted with a sulfonic group.

* * * * *